(12) United States Patent
Kuhn et al.

(10) Patent No.: US 7,575,655 B2
(45) Date of Patent: Aug. 18, 2009

(54) PRIMER FOR HEAT-CURABLE SILICONE ELASTOMERS

(75) Inventors: Arvid Kuhn, Muehldorf (DE); Erich Pilzweger, Julbach (DE)

(73) Assignee: Wacker Chemie AG, Munich (DE)

( * ) Notice: Subject to any disclaimer, the term of this patent is extended or adjusted under 35 U.S.C. 154(b) by 567 days.

(21) Appl. No.: 11/377,169

(22) Filed: Mar. 16, 2006

(65) Prior Publication Data

US 2006/0207723 A1 Sep. 21, 2006

(30) Foreign Application Priority Data

Mar. 18, 2005 (DE) .................. 10 2005 012 694

(51) Int. Cl.
*C09J 183/00* (2006.01)
*C08L 83/04* (2006.01)

(52) U.S. Cl. ...................... 156/329; 524/863

(58) Field of Classification Search .......... 156/329
See application file for complete search history.

(56) References Cited

U.S. PATENT DOCUMENTS

| | | | | |
|---|---|---|---|---|
| 2,643,964 A * | 6/1953 | Smith-Johannsen | .......... | 442/71 |
| 2,744,878 A * | 5/1956 | Smith-Johannsen | ......... | 524/425 |
| 2,751,314 A * | 6/1956 | Keil | ............. | 428/354 |
| 2,843,555 A * | 7/1958 | Berridge | .................. | 528/39 |
| 3,225,419 A * | 12/1965 | Milton et al. | ................ | 492/56 |
| 3,359,294 A * | 12/1967 | Domba | .................. | 556/457 |
| 3,368,928 A * | 2/1968 | Chadha et al. | .............. | 148/265 |
| 3,499,859 A * | 3/1970 | Matherly | .................. | 524/701 |
| 3,505,099 A * | 4/1970 | Neuroth | .................. | 428/447 |
| 3,529,035 A * | 9/1970 | Lamoreaux | ................. | 525/477 |
| 3,560,244 A * | 2/1971 | Neuroth | .................. | 428/447 |
| 3,677,998 A * | 7/1972 | Young | .................. | 524/178 |
| 3,772,122 A * | 11/1973 | Young | .................. | 156/329 |
| 3,775,452 A | 11/1973 | Karstedt | | |
| 3,794,556 A * | 2/1974 | Young | .................. | 428/413 |
| 3,960,800 A * | 6/1976 | Kohl, Jr. | .................. | 556/442 |
| 4,287,114 A | 9/1981 | Hoh et al. | | |
| 4,359,233 A | 11/1982 | Jackson et al. | | |
| 4,808,483 A * | 2/1989 | Nakasuji et al. | ............. | 428/447 |
| 5,081,181 A * | 1/1992 | Takahashi et al. | ............ | 524/766 |
| 5,306,759 A * | 4/1994 | Sakagami et al. | ............ | 524/379 |
| 5,486,567 A * | 1/1996 | Arai et al. | .................... | 524/863 |
| 5,504,176 A * | 4/1996 | Fujiki | .......................... | 528/18 |
| 5,985,994 A * | 11/1999 | Oberneder et al. | .......... | 524/864 |
| 6,077,967 A * | 6/2000 | Cardinaud et al. | .......... | 556/469 |
| 6,211,307 B1 * | 4/2001 | Iwabuchi et al. | ............ | 525/477 |
| 6,403,689 B1 * | 6/2002 | Lehaut et al. | ............... | 524/431 |
| 2003/0116273 A1 | 6/2003 | Nakamura et al. | | |
| 2003/0229241 A1 * | 12/2003 | Anderson et al. | ........... | 556/472 |
| 2004/0266923 A1 * | 12/2004 | Fehn et al. | .................. | 524/261 |

FOREIGN PATENT DOCUMENTS

| | | | |
|---|---|---|---|
| EP | 0044673 | * | 1/1982 |
| EP | 0 110 370 B1 | | 4/1987 |
| EP | 0 241 851 A2 | | 10/1987 |
| EP | 0 347 049 A2 | | 12/1989 |
| EP | 0 851 009 A2 | | 1/1998 |
| EP | 0 781 823 B1 | | 7/2000 |
| FR | 2 809 114 A | | 5/2000 |
| WO | WO 01/88049 A1 | | 11/2001 |

OTHER PUBLICATIONS

Certified English-language translation of Cardinaud et al. (WO-0188049), translated by Shreiber Translation, Inc. in Apr. 2009.*
English Derwent Abstract AN 2002—147541 [19] corresponding to FR 2 809 114 A1 May, 2000.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

A primer composition for silicone rubbers, in particular for addition-crosslinking silicone rubbers, comprises a tetraalkoxysilane and/or partial hydrolysate thereof, a metal salt, alkoxide, or chelate and/or partial hydrolysate thereof, a silicone resin, and from 50-95% by weight of solvent. The primer provides excellent adhesion between silicone rubber and numerous substrates.

17 Claims, No Drawings

PRIMER FOR HEAT-CURABLE SILICONE ELASTOMERS

BACKGROUND OF THE INVENTION

1. Field of the Invention

The present invention pertains to a primer composition and the preparation and use thereof. More particularly, the invention pertains to a primer composition for silicone elastomers ("rubbers"), in particular for addition-crosslinking silicone rubbers, the preparation thereof, and to a process for improving the adhesion of silicone rubbers to substrates, in particular to metal substrates.

2. Background Art

Silicone elastomers have properties which make them preferable to other elastomers in many applications, an example being their thermal stability over a wide temperature range. In some applications strong bonds between a soft elastomeric material such as a silicone rubber, and a hard substrate, for example, a metal or a thermoplastic, are required. If an adequate bond to the substrate cannot be achieved by self-adhesive rubbers by means of inherent characteristics or through use of the suitable additives, the bond strength can be improved by pretreatment of the substrate surface with a suitable primer.

The efficiency of the primer is dependent both on the composition and surface characteristics of the substrate, and on the composition, the crosslinking system, the additives, and the viscosity of the silicone rubber which is to be adhered. According to the prior art, primer coats which are combinations of tetraalkoxysilanes, or partial hydrolysis products of tetraalkoxysilanes with metal alkoxides or metal chelates are used. These are optionally used in combination with a suitable solvent.

U.S. Pat. No. 2,751,314 describes a method for increasing adherence of silicone rubber to solid substrates, in which a coating consisting of a titanium alkoxide and an alkyl polysilicate or partial hydrolysis product thereof is applied to the substrate.

European published Application EP 0 347 049 A2 discloses improved primer compositions for the adhesion of silicone elastomers to inorganic substrates, such as glass or metal. The primer coat contains a tetraalkyl titanate, at least one alkyl orthosilicate and a hydrocarbon solvent, the solvent having a composition such that from 2 to 25% by weight of the total composition consists of an alcohol having from 4 to 20 carbon atoms. The alcohol present as solvent, preferably n-butanol, maintains the adhesion produced by the primer coat even after storage of the bond in water.

Published EP 0 241 851 A2 describes a method for coating substrates with a primer coat containing a tetraalkyl titanate, an organyloxysilane, for example tetraethyl orthosilicate, and an organic solvent. The primer coat serves here as a protective coating.

U.S. Pat. No. 4,356,233 discloses primer compositions containing a silane which contains no amino or amido functionality, a metal ester, preferably an inorganic acid, and an organic solvent. A preferred silane is methacryloyloxypropyltrimethoxysilane. The primer coat is cured by heat after application to the substrate before a further polymerizable composition containing epoxy- or vinyl-containing monomers is applied.

European patent EP 0 781 823 B1 discloses primer compositions consisting of an alkenyl trialkoxysilane, a platinum compound, by means of which the binding of the rubber to the primer coat is improved, an organic titanate ester and a solvent. The alkenyl group of the alkenyl trialkoxysilane contains minimally three carbon atoms.

US published application 2003/0116273 A1 discloses a method for adhesively bonding optical components such as glass lenses or optical fibers to an adhering resin compositions by means of a primer composition. The primer composition contains either a trialkoxysilane carrying epoxy groups or a trialkoxysilane carrying alkenyl groups, and furthermore contains a tetraalkoxysilane, a metal alkoxide and a solvent. Such compositions lead to excellent heat stability and excellent parting forces and suppress the formation of bubbles during cure, thus preventing reduced transparency in the optical components.

International Patent Application WO 2001/88049 A1 describes primer compositions containing at least one tetraalkoxysilane and/or at least one alkyl polysilicate, at least one metal chelate and/or metal alkoxide, and at least one organic solvent. The tetraalkoxysilane and/or alkyl polysilicate have a specific degree of condensation, expressed as a ratio of tetraalkoxysilane $Si(OR)_4$ to silyloxy units condensed to different degrees. The preferred ratios in the composition are $0 \leq Si(OR)_4 \leq 5$, $0 \leq SiO_{1/2}(OR)_3 \leq 30$, $0 \leq SiO_{2/2}(OR)_2 \leq 75$, $20 \leq SiO_{3/2}(OR) \leq 100$ and $0 \leq SiO_{4/2} \leq 25$. The primer composition according to WO 2001/88049 A1 is used for bonding addition-crosslinking RTV-2 silicone rubber to aluminum or epoxy resin substrates. As a result of the use of more highly condensed tetraalkoxysilanes in the primer coats, the composition is less sensitive to moisture and leads to cohesive tearing in the rubber, even after storage of the composites in water.

The prior art therefore describes a number of primer compositions and methods for bonding silicone rubber to substrates. However, the known primer compositions have proven to be inadequate under certain conditions, such as, for example, dynamic loading of the composites.

SUMMARY OF THE INVENTION

An object of the present invention is to provide primer coats which permit improved adhesion of silicone rubber, in particular, of addition-crosslinking silicone rubber, to various substrates, in particular to metals, which do not share disadvantages of the prior art. These and other objects are achieved by the invention, which employs a primer coat containing a tetraalkoxysilane and/or partial hydrolysis product thereof; a metal salt, alkoxide, or chelate and/or a partial hydrolysis product thereof; a silicone resin; and a solvent.

DETAILED DESCRIPTION OF THE PREFERRED EMBODIMENT(S)

The present invention therefore relates to a primer composition containing:

(A) 100 parts by weight of at least one tetraalkoxysilane and/or a partial hydrolysis product of at least one tetraalkoxysilane, (B) 25-400 parts by weight, based on 100 parts by weight of component (A) of at least one metal salt, metal alkoxide, metal chelate, a partial hydrolysis product thereof, or mixture thereof, (C) 25-125 parts by weight, preferably 40-110, parts by weight, based on 100 parts by weight of component (A), of at least one silicone resin, and (D) at least one solvent selected from the group consisting of organic solvents, low molecular weight cyclic and linear polyorganosilicone compounds and mixtures thereof, with the proviso that the proportion of solvent, based on the total composition, is 50-95% by weight, preferably from 70 to 90% by weight.

The component (A) of the primer composition according to the invention is preferably a tetraalkoxysilane of the average general formula (I)

$$Si(OR^1)_4 \qquad (I),$$

in which $R^1$ is a monovalent, substituted or unsubstituted hydrocarbon radical having 1 to 18 carbon atoms, a mixture of at least two such tetraalkoxysilanes, or a partial hydrolysis product of such a tetraalkoxysilane or mixture of one or more tetraalkoxysilanes.

$R^1$ is preferably a monovalent hydrocarbon radical having 1 to 6 carbon atoms, the methyl and ethyl radicals being preferred. Ethyl radicals are particularly preferred.

If the content of component (A) in the total mixture of the primer composition is too low, the desired adhesive force between substrate and rubber is not established. If the content is too high, the primer coat applied to the substrate may become brittle or fissured after evaporation of the solvent.

Examples of radicals $R^1$ include alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl and 2-ethylhexyl radicals, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, and p- tolyl radicals, xylyl radicals and ethylphenyl radicals; and aralkyl radicals such as the benzyl radical and the α- and the β-phenylethyl radicals.

Examples of substituted radicals $R^1$ are haloalkyl radicals, such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radical, and all radicals mentioned above for $R^1$, which may be substituted by mercapto groups, epoxy functional groups, carboxyl groups, keto groups, enamine groups, amino groups, aminoethylamino groups, isocyanato groups, aryloxy groups, acryloyl groups, methacryloyloxy groups, hydroxyl groups and halogen groups. Further examples are alkoxylated radicals, such as ethoxyethyl or methoxyethyl groups.

Examples of tetraalkoxysilanes as component (A) are tetramethoxysilane, tetraethoxysilane, tetrapropoxysilane and tetrabutoxysilane. Further examples are silanes which contain two or more different alkoxy groups, such as, for example, methoxy groups together with ethoxy groups and/or butoxy groups, for example, triethoxymonomethoxysilane, diethoxydimethoxysilane, monoethoxytrimethoxysilane or monomethoxytributoxysilane. Further examples are silanes having alkoxyalkoxy groups, such as, for example, tetrakis(methoxyethoxy)silane or tetrakis(methoxypropoxy)silane. These examples are illustrative and not limiting.

If component (A) is a partial hydrolysis product, this is to be understood as meaning an alkyl polysilicate which can be obtained by partial hydrolysis and condensation from the tetraalkoxysilanes of general formula (I). The partial hydrolysis product can be prepared in a controlled manner in a preceding step or can form in situ during the preparation of the primer composition. For good reproducibility, a preceding reaction step is preferred. For economical preparation, the partial hydrolysis can, however, also be effected during preparation of the overall composition.

In the hydrolysis, first silanols form from the tetraalkoxysilanes $Si(OR^1)_4$ (referred to below as a Q0 unit) and subsequently, by condensation, alkyl polysilicates which consist of Q1 units $(R^1O)_3SiO_{1/2}$, Q2 units $(R^1O)_2SiO_{2/2}$, Q3 units $(R^1O)_1SiO_{3/2}$ and Q4 units $SiO_{4/2}$.

The more complete the hydrolysis/condensation, the greater are the proportions of the more highly condensed units Q4 and Q3 in the mixture and the lower is the ratio $R^1O$—Si/Si of alkoxy groups bonded to the silicon, to silicon atoms. In the reaction product of the hydrolysis/condensation, the ratio of the Q0 to Q4 units to one another can be determined by conventional analytical techniques, for example, by $^{29}$Si NMR-spectroscopy.

Partial hydrolysis products of tetraalkoxysilanes or mixtures of tetraalkoxysilanes with their partial hydrolysis products are preferred as constituent (A) in the primer composition according to the invention.

With the use of such partial hydrolysis products, the resulting compositions are less sensitive to the influence of moisture and hence have a longer shelf life and are more robust during use. A further advantage of this embodiment according to the invention is that after application, the primer coat is less brittle because less volatile constituents are eliminated from the solids content of the composition and hence the volumetric shrinkage is lower. On the other hand, an excessively high degree of condensation of the partial hydrolysis product in the composition is also disadvantageous since in this case the formation of a homogeneous coat in association with the further constitutents becomes more difficult.

A constituent (A) which consists of a mixture of one or more tetraalkoxysilanes and the corresponding partial hydrolysis products and may therefore contain units Q0, Q1, Q2, Q3 and Q4 defined above, the constituent (A) containing:

0-45 mol % of Q0 units, 30-80 mol % of Q1 units, 5-50 mol % of Q2 units, 0-20 mol % of Q3 units and more preferably 5-35 mol % of Q0 units, 35-70 mol % of Q1 units, 10-40 mol % of Q2 units, 1-15 mol % of Q3 units, wherein the remaining mol percentages of the radicals comprise Q4 units, is therefore preferred. A partial hydrolysis product having such a distribution, in which the radical $R^1$ is ethyl, is particularly preferred.

The inventive primer composition according to the invention contains, as constituent (B), one or more condensation catalysts for the hydrolysis and/or condensation of the hydrolyzable groups of the other constituents. Metal compounds selected from the group consisting of metal salts, metal alkoxides, metal chelates, the partial hydrolysis products thereof and mixtures thereof are therefore used as constituent (B).

Alkoxides of metals M of the average general formula (II)

$$M(OR^2)_n \qquad (II),$$

chelates of metals M of the average general formula (III)

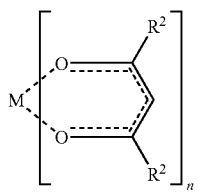

(III)

or metal carboxylates of the average general formula (IV)

(IV)

are preferably used, n being the valency of the metal M. The metal compounds of the constituent (B) may be present as monomers, as oligomers, as hydrolysis products or as partial hydrolysis products.

The metal M is preferably selected from the group of the metals titanium, zirconium, hafnium, manganese, iron, copper, zinc, aluminum, germanium, tin and magnesium, more preferably from the group of titanium, zirconium, iron, aluminum or zinc, most preferably titanium, aluminum or zirconium. Mixtures of compounds of the various metals may also be used, or only one metal or metal compound may be present.

The radical $R^2$ is selected from the group consisting of the linear or branched, optionally substituted alkyl or alkenyl radicals having 1-18 carbon atoms. The radical $R^2$ may also be identical to $R^1$. In the case of the general average formula (III), $R^2$ may also be identical to $OR^2$. $R^2$ are preferably methyl, ethyl, propyl, isopropyl, butyl, isobutyl, sec-butyl, acryloyl, methacryloyl, ethenyl and methylethenyl radicals. Methyl, ethyl, butyl, sec-butyl and methacryloyl radicals are particularly preferred.

The radical $R^3$ is preferably selected from the group consisting of the linear or branched alkyl or alkenyl radicals having 1-18 carbon atoms or from radicals $R^2$. $R^3$ are preferably methyl, ethyl, propyl, isopropyl, butyl, isobutyl, sec-butyl, acryloyl, methacryloyl, ethenyl and methylethenyl radicals.

Examples of constituent (B) are tetramethyl titanate, tetraethyl titanate, tetra-n-propyl titanate, tetraisopropyl titantate, tetra-n-butyl titanate, tetraisobutyl titanate, tetra-sec-butyl titanate, tetraoctyl titanate, tetra(2-ethylhexyl) titanate, diisopropoxybis(acetylacetonate) titanate, diisopropoxybis(ethylacetylacetonate) titantate, terakis(trimethylsilyoxy) titanate, di-n-butylbis(acetylacetonate) titanate, di-n-butylbis (ethylacetoacetate) titanate, triisopropoxidebis(acetylacetonate) titanate, methacryloyl triisopropyl titanate, zirconium tetraethylate, zirconium tetrabutylate, zirconium tetrabutyrate, zirconium tetrapropylate, zirconium diacetate, zirconium tetra(acetylacetonate), zinc dimethacrylate, tributoxyzirconium acetylacetonate, dibutoxyzirconium bisacetylacetonate, aluminum tris(acetylacetonate), aluminum triisopropylate, aluminum trisbutylate and aluminum tris(ethylacetylacetonate). Tetramethyl titanate, tetraethyl titanate, tetra-n-propyl titanate, tetraisopropyl titanate, tetra-n-butyl titanate and tetraisobutyl titanate are preferred. Tetramethyl titanate, tetraethyl titanate and tetra-n-butyl titanate are particularly preferred.

The compositions according to the invention preferably contain, based on 100 parts by weight of (A), about 25-400 parts by weight of constitutent (B), more preferably 50-200 parts by weight of (B) and most preferably 60-180 parts by weight of (B). If the proportion of constituent (B) in the composition is too low, the adhesion between rubber and substrate is adversley affected. Furthermore, the time which is required for the formation of a homogeneous film after application of the primer coat to the substrate is increased. If the proportion of constituent (B) is too high, the primer coat may become brittle, with the result that good adhesion can no longer be established.

The constituent (C) is a silicone resin. Examples of component (C) are MQ, MT, MDQ, MDT, MTQ and MDTQ silicone resins, M being $R^1_3SiO_{1/2}$ or $R^1_aR^4_{3-a}SiO_{1/2}$, (where a=0, 1, 2 or 3), D being $R^1_2SiO_{2/2}$ or $R^1_{a'}R^4_{2-a'}SiO_{2/2}$ (where a'=0, 1 or 2), T being $R^1SiO_{3/2}$ or $R^4SiO_{3/2}$ and Q being $SiO_{4/2}$, $R^1$, in each case independently of one another, being a radical as described above or a radical as described above and bonded via —O—, it being possible for $R^4$, in each case independently of one another, to be $R^1$ or to be a substituted or unsubstituted monovalent hydrocarbon radical having 2-18 carbon atoms which is aliphatically unsaturated. The radical $R^4$ may be bonded to the silicone resin via SiC or SiO—C bonds. If the radical $R^1$ is bonded to the resin via an Si—O bond, the structural element $SiO_{3/2}(OR^1)$ is preferred.

Preferred examples of radicals $R^4$ are alkenyl radicals such as the vinyl, 1-propenyl, allyl, 3-butenyl, 4-pentenyl, 5-hexenyl, and cyclohexenyl radicals, and alkynyl radicals such as the ethynyl, propargyl and 1-propynyl radicals.

MQ resins which are completely soluble in organic solvents such as toluene, which have 40-70 mol % of Q units and 30-60 mol % of M units as determined by $^{29}$Si-NMR spectroscopy, and which have a number average molecular weight $M_n$ determined by size exclusion chromatography (SCC) of 1000-20,000 g/mol, are particulaly preferred. The preferred resins have $SiOR^1$ groups, the ratio of Q units to Si—$OR^1$ groups (Q/$SiOR^1$) preferably being from 4 to 20.

The M, D, and T units of the resins used may carry only $R^1$ radicals. However, those resins which have $R^1$ and $R^4$ radicals are preferred. Those resins in which the ratio of the radicals $R^1/R^4$ is from 5 to 50, particularly preferably from 12 to 35 are particularly preferred. In a preferred embodiment, the constituent (C) is an MQ resin, $R^1$ being a methyl or ethyl group and $R^4$ a vinyl group.

The constituent (C) is present in the compositions according to the invention in an amount of 25-250 parts by weight, preferably 40-150 parts by weight, based on 100 parts of constituent (A). The constituent (C) is essential for the compositions. If the proportion of constituent (C) is too low or if constituent (C) is not present at all, the strength of the primer coat suffers or a uniform film no longer forms. In the case of proportions which are too high, the coat may become brittle. In each case, substantially poorer bonding of the rubber to the substrate results.

Constituent (D) is a solvent which is selected from the group consisting of the organic solvents and the low molecular weight cyclic or linear polyorganosilicone compounds, in which the other constituents of the composition are dissolved, partially dissolved or suspended or emulsified. The choice of the solvent is dependant on various factors, such as, for example, on the volatility, on the polarity and on the power of dissolving the other constituents. The choice of the solvent also influences the ability of the composition to wet the substrate surface.

Solvents having a high vapor pressure lead to short drying times, which may be preferred owing to the more rapid processability. Excessively high vapor pressures, on the other hand, may cause the solvent to evaporate too rapidly, which may mean that a homogeneous film does not form. On the other hand the vapor pressure of the solvent should also not be so low that the evaporation of the solvent takes too long or a part of the solvent remains behind on the substrate, since this will impair the adhesion of the rubber. Since the rate of the hydrolysis/condensation of the hydrolyzable groups increases with the temperature, the solvent can also be adapted to the desired processing temperature. A composition which permits the formation of a uniform film over a wide temperature range is optimum.

Examples of constituent (D) are organic solvents such as hydrocarbons, for example substituted or unsubstituted alkanes or cycloalkanes such as pentane, hexane, cyclohexane, heptane, octane, isooctane, 2-ethylhexane, nonane, decane, and higher linear or branched alkanes or mixtures of such alkanes, dichloromethane, trichloromethane, trichloroethylene; substituted or unsubstitued aromatic hydrocarbons such as benzene, toluene, xylene(s), chlorobenzene, or mixtures thereof; esters such as methyl acetate and ethyl acetate, ketones, and such as acetone, methyl ethyl ketone, methyl isobutyl ketone, and cyclohexanone; linear or cyclic ethers such as diethyl ether, dipropyl ether, dibutyl ether, tert-butyl methyl ether, tetrahydrofuran, and 1,4-dioxane; substituted or unsubstituted alcohols such as methanol, ethanol, n-propanol, isopropanol, n-butanol, isobutanol, sec-butanol, tert-butanol, 1-pentanol, 2-pentanol, 3-pentanol, isopentanol, ethylhexanol, and cyclohexanol, and glycol ethers such as ethylene glycol dimethyl ether. In the case of alcohols, ethanol, isopropanol and sec-butanol are preferred, and sec-butanol is particularly preferred.

Hydrocarbons having boiling points below about 50° C. are as a rule unsuitable owing to the excessively rapid evaporation, if they are used as the sole solvent or as the main constituent. Preferred hydrocarbons are alkanes, or mixtures of alkanes whose boiling points are from 60 to 250° C., more preferably from 90 to 200° C. If alkane mixtures or distillate fractions are used, the boiling range of the mixture is preferably not more than 50° C., more preferably not more than 30° C.

Further examples of component (D) are low molecular weight cyclic or linear polyorganosilicone compounds. Examples are linear polyorganosilicone compounds such as hexamethyldisiloxane and octamethyltrisiloxane, and higher oligomers and cyclic polyorganosilicone compounds, such as, for example, hexamethylcyclotrisiloxane, octamethylcyclotetrasiloxane, decamethylcyclopentasiloxane and higher cyclic polyorganosilicone compounds, or mixtures of different linear and/or cyclic polyorganosilicone compounds.

The constituent (D) may consist of an individual organic solvent, an individual polyorganosilicone compound, mixtures of different organic solvents, mixtures of different polyorganosilicone compounds or mixtures of organic solvents with polyorganosilicone compounds. The compositions contain the component (D) in proportions of from 50 to 95 percent by weight of the total composition, preferably from 70 to 90 percent by weight.

The optimum solvent or solvent mixture for a composition may also be dependent on the respective application, i.e. on the composition of the substrate, the substrate surface or the processing conditions, for example, the desired duration and temperature during air-drying or baking of the primer coat.

Good wetting of the substrate surface by the primer composition is a precondition for the formation of a uniform primer film. The ability of the composition to wet the substrate surface is dependent on the surface tension of the composition and the surface energy of the substrate surface. The surface tension of the composition is determined to a great extent by the surface tension of the solvent. Solvents having relatively high surface tensions γ, such as toluene or xylenes (approximately g=28 mN/m at 25° C.; source: CRC Handbook of Chemistry and Physics, 84th edition, Boca Raton 2003), can lead to difficulties in wetting certain substrates. Low surface tensions lead, as a rule, to increased wettability, the limit being dictated by the critical surface tension of the substrate: a liquid having a surface tension below this value wets the surface. Solvents having a lower surface tension, such as aliphatic hydrocarbons or organosilicone compounds such as hexamethyldisiloxane, are therefore preferred, if the other properties, such as vapor pressure or dissolving power, do not prevent their use. If, owing to the dissolving power, more polar solvents are required, alcohols are preferred. Isopropanol and sec-butanol are particularly preferred. Mixtures are also possible. Thus, the primer composition according to the invention can be prepared, for example, using sec-butanol as a solvent and can be diluted with aliphatic hydrocarbons or with alcohols such as ethanol or isopropanol, before use.

In a preferred embodiment, the primer composition according to the invention contains, as solvent (D), from 70 to 90 percent by weight of a hydrocarbon fraction substantially comprising C7 to C10 alkanes and having a boiling range of 110-140° C. or a hydrocarbon fraction substantially comprising C9 to C12 alkanes and having a boiling range of 150-180° C.

In another preferred embodiment, the primer composition contains, as solvent (D), from 70 to 95 percent by weight of an aliphatic alcohol selected from the group consisting of ethanol, isopropanol, n-butanol, isobutanol or sec-butanol or a mixture of two or more of these alcohols. Compositions containing 70-95 percent by weight of sec-butanol or 70-95 percent by weight of a mixture of sec-butanol with isopropanol or ethanol are particularly preferred as constituent (D), at least one fifth of this mixture preferably consisting of sec-butanol.

Mixtures of aliphatic hydrocarbons with alcohols can also be used as constituent (D), such compositions preferably containing at least 30 percent by weight of the alcohol, based on the total composition.

In a further preferred embodiment, the compositions according to the invention may additionally contain, as constituent (E), one or more organosilicon compounds having at least one hydrolyzable group or the partial hydrolysis product thereof, the organosilicon compound being selected from the group consisting of the compounds having the average general formula (V):

$$R^5{}_bR^6{}_cR^7{}_dSiX_{4-b-c-d} \qquad (V)$$

in which

R$^5$ is a monovalent, aliphatically unsaturated, substituted or unsubstituted hydrocarbon radical having 2 to 18 carbon atoms, R$^6$ is an optionally halogen-substituted, monovalent hydrocarbon radical having 1 to 18 carbon atoms, R$^7$ are R$^5{}_b$R$^6{}_c$SiX$_{3-b-c}$—R$^8$— or YR$^8$-radicals, X is a hydrolyzable group selected from the groups —O$_2$CR$^6$, —OR$^6$, —NR$^6{}_2$, R$^6$—C(=O)—N(R$^6$)—, or —O—N=CR$^6{}_2$, Y is a monovalent radical selected from the group consisting of anhydride, aminoalkoxy, aminoalkyl, N-aminoalkylamino, acryloyloxy, methacryloyloxy, sulfone, sulfonate, phosphate, phosphonate, amino, N-alkylamino, epoxy, and mercapto radicals, R$^8$ is a divalent, optionally substited hydrocarbon radical having 1 to 22 carbon atoms, which may contain heteroatoms selected from the group of N, O, and S,and b,c,d are, independently, 0, 1, 2 or 3

Examples of radical $R^5$ are alkenyl radicals, such as, vinyl, allyl or higher alkenyl radicals.

Here, the radical $R^6$ has the same meaning as the radical $R^1$. Preferred examples of $R^6$ are monovalent alkyl radicals, such as methyl or ethyl radicals.

Examples of radical $R^7$ are thiopropyl, 3-glycidyloxypropyl, 2-(3,4-epoxycyclohexyl)ethyl, aminopropyl, aminoethylaminopropyl, methacryloyloxypropyl, acryloyloxypropyl, methacryloyloxymethyl and acryloyloxymethyl radicals and trialkoxysilylalkylene radicals, such as 2-triethoxysilylethyl.

Examples of $R^8$ are divalent hydrocarbon radicals such as methylene, ethylene, propylene, butylene, or higher alkylene radicals such as —$(CH_2)_8$—; phenylene and xylylene radicals, and —$CH_2CH(CH_3)$—$C_6H_4$—$CH(CH_3)CH_2$—, —$CH_2CH_2$—$C_6H_4$—$CH_2CH_2$—, —$C_6H_4$—$CR^6_2$—$C_6H_4$—, —$C_3H_6O$—$C_6H_4$—$CR^6_2$—$C_6H_4$—$OC_3H_6$— and substituted radicals, such as hydroxyhydrocarbon radicals and ether radicals, such as —$CH_2O(CH_2)_3$—, —$CH_2CH_2$—$O$—$CH_2CH_2$—, —$CH_2CH_2$—$O$—$CH(CH_3)CH_2$—, —$CH_2$—$O$—$CH_2CH_2$—$O$—$CH_2$—, —$CH_2CH_2CH_2$—$O$—$CH_2CH_2CH_2$— and —$CH_2CH_2CH_2$—$OC(=O)O$—$CH_2CH_2CH_2$—.

Examples of constituent (E) are alkoxysilanes such as vinyltrimethoxysilane, vinyltriethoxysilane, methylvinyldimethoxysilane, dimethylvinylmethoxysilane, vinyltris(methoxypropoxy)silane, vinyltris(2-methoxyethoxy)silane, 3-(methacryloyloxy)propyltrimethoxysilane, 3-(methacryloyloxy)methyltrimethoxysilane, 3-(methacryloyloxy)propyltriethoxysilane, 3-(methacryloyloxy)methyltriethoxysilane, 3-(methacryloyloxy)propylmethyldimethoxysilane, 3-(methacryloyloxy)propyldimethylmethoxysilane, 3-(acryloyloxy)propyltrimethoxysilane, 3-(acryloyloxy)methyltrimethoxysilane, 3-(acryloyloxy)propyltriethoxysilane, 3-(acryloyloxy)methyltriethoxysilane, allyltrimethoxysilane, allyltriethoxysilane, allyldiethoxysilane, mercaptopropyltrimethoxysilane, mercaptopropyltriethoxysilane, mercaptopropylmethyldimethoxysilane, 3-mercaptopropylmethyldiethoxysilane, 3-(2-aminoethylamino)propyltrimethoxysilane, 3-(2-aminoethylamino)propylmethyldimethoxysilane, 3-cyclohexylaminopropyltrimethoxysilane, 3-aminopropyltrimethoxysilane, 3-aminopropyltriethoxysilane, 3-(glycidyloxy)propyltrimethoxysilane, 3-(glycidyloxy)propyltriethoxysilane, 3-(glycidyloxy)propylmethyldimethoxysilane, 2-(3,4-epoxycyclohexyl)ethyltrimethoxysilane, 3-isocyanatopropyltrimethoxysilane, 3-isocyanatopropylmethyldimethoxysilane, 3-isocyanatopropyltriethoxysilane, 3-isocyanatopropylmethyldiethoxysilane, (isocyanatomethyl)trimethoxysilane, (isocyanatomethyl)methyldimethoxysilane, (isocyanatomethyl)triethoxysilane, (isocyanatomethyl)methyldiethoxysilane, (aminomethyl)trimethoxysilane, (aminomethyl)methyldimethoxysilane, (anilinomethyl)trimethoxysilane, (anilinomethyl)methyldimethoxysilane, (anilinomethyl)triethoxysilane, (hexylaminomethyl)trimethoxysilane, (hexylaminomethyl)methyldimethoxysilane, 3-(triethoxysilyl)propylsuccinic anhydride, 3-cyanopropyltrimethoxysilane, tetramethoxysilane, tetraethoxysilane, tetrapropoxysilane, tetrabutoxysilane, chloropropyltrimethoxysilane, chloromethyltrimethoxysilane, chloromethyldimethoxysilane, methyltrimethoxysilane, methyltriethoxysilane, isooctyltrimethoxysilane, cyclohexylmethyldimethoxysilane, 1,2-bis(methyldiethoxysilyl)ethane, 1,2-bis(trimethoxysilyl)ethane, 1,2-bis(triethoxysilyl)ethane, 1,6-bis(trimethoxysilyl)hexane and 1,8-bis(trimethoxysilyl)octane.

Further examples are aminosilanes, acyloxysilanes and aldoximo- and ketoximosilanes, such as, for example, triacetoxy(vinyl)silane, diacetoxy(methyl)(vinyl)silane, tris(butylamino)vinylsilane and tris(diethylamino)vinylsiloxane.

Preferred examples of constituent (E) are vinyltrimethoxysilane, vinyltriethoxysilane, 3-(methacryloyloxy)propyltrimethoxysilane, 3-(methacryloyloxy)methyltrimethoxysilane, 3-(methacryloyloxy)methyltriethoxysilane, 3-(acryloyloxy)propyltrimethoxysilane, 3-(acryloyloxy)methyltrimethoxysilane, allyltrimethoxysilane, 3-(glycidyloxy)propyltrimethoxysilane, 2-(3,4-epoxycyclohexyl)ethyltrimethoxysilane, 1,2-bis(trimethoxysilyl)ethane and 1,2-bis(triethoxysilyl)ethane. Even more preferred are vinyltriethoxysilane, 3-(methacryloyloxy)propyltrimethoxysilane, 3-(methacryloyloxy)methyltrimethoxysilane, 3-(glycidyloxy)propyltrimethoxysilane, and 1,2-bis(triethoxysilyl)ethane.

The compositions according to the invention preferably contain from 1 to 200 parts by weight, based on 100 parts by weight of constituent (A), of the constituent (E), preferably from 5 to 150 parts by weight and most preferably from 10 to 80 parts by weight.

Optionally, the composition may contain, as further constituents, metal compounds such as platinum or rhodium metals and/or compounds and complexes thereof, for improving the bonding of the rubber to the primer coat by addition reaction of Si—H groups with aliphatically unsaturated compounds. Such compounds serve as curing catalysts. Platinum and/or compounds thereof are preferably used. Here, it is possible to use all catalysts which are useful for the addition reaction of hydrogen atoms bonded directly to Si atoms with aliphatically unsaturated compounds. Examples of such catalysts are metalic and finely divided platinum, which may be present on supports such as silica, alumina or active carbon, compounds or complexes of platinum such as platinum halides, most preferably $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes including reaction products of $H_2PtCl_6.6H_2O$ and cyclohexanone, platinum-vinylsiloxane complexes, in particular platinum-divinyltetramethyldisiloxane complexes with or without a content of detectable inorganically bonded halogen, bis(gamma-picoline) platinum dichloride, trimethylenedipyridineplatinum dichloride, dicyclopentadieneplatinum dichloride, dimethylsulfoxyethyleneplatinum(II) dichloride and reaction products of platinum tetrachloride with olefin and primary amine or secondary amine or with primary and secondary amine, such as the reaction product of platinum tetrachloride, dissolved in 1-octene, with sec-butylamine, or the ammonium-platinum complexes according to the disclosure of European Patent EP 0 110 370 B1. An example of a preferred catalyst is the platinum-1,3-divinyl-1,1,3,3-tetramethyldisiloxane complex known as a Karstedt cataylst, as described, for example, in the patent U.S. Pat. No. 3,775,452.

The platinum catalyst is preferably used in amounts of from 0.05 to 500 ppm by weight (parts by weight per million parts by weight), in particular from 0.2 to 400 ppm by weight, calculated in each case as elemental platinum and based on the total weight of the constituents (A), (B), (C) and (E).

Furthermore, in a preferred embodiment, the primer composition according to the invention may contain inhibitors which regulate the activty of the platinum catlyst. Examples of inhibitors are low molecular weight silicone oils having terminal methylvinyl $SiO_{1/2}$ groups such as 1,3-divinyl-1,1,3,3-tetramethyldisiloxane; polymethylvinylcyclosiloxanes such as methylvinylcyclotetrasiloxane; organic or organosilicon compounds having a boiling point of at least 25° C. at 1012 mbar (abs.) and at least one aliphatic triple bond such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol; alkyl maleates such as diallyl maleate and dimethyl maleate; alkyl fumarates such as diethyl fumarate; and diallyl fumarate, a mixture of diallyl maleate and vinyl acetate' maleic monoesters; benzotriazole; dialkylformamides; alkylthioureas; organic sulfoxides; organic amines and amides, phosphines and phosphites; nitriles; diaziridines; and oximes such as methyl ethyl ketoxime; trialkyl cyanurates; and inhibitors such as the compound of the formula HC=C—C(CH$_3$)(OH)—CH$_2$—CH$_2$—CH=C(CH$_3$)$_2$, commercially available under the trade name "Dehydrolinalool" from BASF, Ludwigshafen, Germany.

The primer composition according to the invention may furthermore contain H-siloxanes. H-siloxanes are linear, cyclic or branched polyorganosiloxanes which have Si-bonded hydrogen atoms and preferably consist of polyorganosiloxanes comprising units of the average general formula (VI)

$$R^1_e H_f SiO_{(4-e-f)/2} \quad (VI),$$

in which
R$^1$ has the abovementioned meaning,
e is 0, 1, 2 or 3, and
f is 0, 1 or 2, with the proviso that the sum (e+f) is <3 and on average at least 2 Si-bonded hydrogen atoms are present. The H-siloxanes may have —(SiR$^1_2$O)— and —(SiR$^1$HO)— units which may be distributed in any desired manner, for example as a block, or randomly in the organopolysiloxane molecule.

Examples of such organopolysiloxanes are in particular copolymers of dimethylhydrogensiloxy, methylhydrogensiloxy, dimethylsiloxy and trimethylsiloxy units, copolymers of trimethylsiloxy, dimethylhydrogensiloxy and methylhydrogensiloxy units, copolymers of trimethylsiloxy, dimethylsiloxy and methylhydrogensiloxy units, copolymers of methylhydrogensiloxy and trimethylsiloxy units, copolymers of methylhydrogensiloxy, diphenylsiloxy and trimethylsiloxy units, copolymers of methylhydrogensiloxy, dimethylhydrogensiloxy and diphenylsiloxy units, copolymers of methylhydrogensiloxy, phenylmethylsiloxy, trimethylsiloxy and/or dimethylhydrogensiloxy units, copolymers of methylhydrogensiloxy, dimethylsiloxy, diphenylsiloxy, trimethylsiloxy and/or dimethylhydrogensiloxy units and copolymers of dimethylhydrogensiloxy, trimethylsiloxy, phenylhydrogensiloxy, dimethylsiloxy and/or phenylmethylsiloxy units.

The primer compositions according to the invention may furthermore optionally contain linear or branched polyorganosiloxanes having aliphatic carbon-carbon multiple bonds of the general average formula (VII)

$$R^1_g R^4_h SiO_{(4-g-h)/2} \quad (VII)$$

in which
R$^4$ is a monovalent hydrocarbon radical having a terminal, aliphatic carbon-carbon multiple bond having 2 to 8 carbon atoms by radical,
g is 0, 1, 2 or 3, and
h is 0, 1 or 2, with the proviso that the sum (g+h) is <3 and these polyorganosiloxanes have on average at least 2 radicals R$^4$.

The polyorganosiloxanes of the general average formula (VII) may have —(SiR$^1_2$O)— and —(SiR$^1$R$^4$O)— units which may be distributed in any desired manner, for example as a block, or randomly in the polyorganosiloxane molecule.

Organic and inorganic peroxides may furthermore be present, in particular organic peroxides such as dialkyl peroxides, diacyl peroxides, aralkyl peroxides, perketales, hydroperoxides, or mixed peroxides such as di-tert-butyl peroxide, tert-butyl hydroperoxide, 2,5-dimethyl-2,5-di(tert-butylperoxy)hexane, dicumyl peroxide, cumyl hydroperoxide, tert-butyl cumyl peroxide, dibenzoyl peroxide, bis(2,4-dichlorobenzoyl) peroxide, bis(4-methylbenzoyl) peroxide, 1,1-di-tert-butylperoxy-3,3,5-trimethylcyclohexane, and vinyltris(tert-butylperoxy)silane.

Reinforcing and non-reinforcing fillers and pigments may furthermore be present. Examples of reinforcing fillers, i.e. fillers having a BET surface area of at least 50 m$^2$/g, are pyrogenically prepared silica, precipitated silica or silicon-aluminum mixed oxides having a BET surface area of more than 50 m$^2$/g. The fillers may have been rendered hydrophobic, for example by treatment with organosilanes, organosilazanes or organosiloxanes or by etherification of hydroxyl groups to give alkoxy groups. Pyrogenically prepared silicas having a BET surface area of at least 100 m$^2$/g are preferred.

Examples of non-reinforcing fillers, i.e. fillers having a BET surface area of less than 50 m$^2$/g, are powders comprising quartz, cristobalite, diatomaceous earth, calcium silicate, zirconium silicate, montmorillonites such as bentonites, zeolites, including molecular sieves such as sodium aluminum silicate, metal oxides such as alumina or zinc oxide or the mixed oxides thereof, metal hydroxides such as aluminum hydroxide, barium sulfate, calcium carbonate, gypsum, silicon nitride, silicon carbide, boron nitride, glass powder, carbon powder, plastic powder, hollow glass spheres, and hollow plastic spheres. The BET surface area of the non-reinforcing fillers is preferably less than 20 m$^2$/g.

It is possible to use one type of filler but it is also possible to use a mixture of at least two fillers. Examples of heat stabilizers or pigments are carbon black, metal carboxylates such as cerium or iron salts of carboxylic acids, for example, fatty acids, carboxylic acid salts of metal oxides or metal hydroxides such as titanium dioxide, iron oxide, calcium hydroxide, and mixed metal oxides of the spinel type.

The preparation of the primer composition according to the invention can be effected by known processes, for example by uniform dissolution or mixing of components (A), (B), (C), (E) and, if appropriate, further optional components in the solvent (D) in a suitable mixing unit, for example, in a stirrer or dissolver. Preferably, but not necessarily, after uniform mixing, the composition can be heated to 50 to 100° C. for half an hour to 4 hours, most preferably to 60° C. to 80° C. for 1 to 2 hours, the reaction of the components with one another being promoted and a more stable product resulting. Before use, the primer composition can be diluted with the solvent used in the preparation or another solvent if, for example, thinner primer films or different wetting behavior is desired. In the preparation, the necessary ingredients described previously may be used while excluding any optional ingredients or any ingredients not specifically mentioned herein.

By means of the primer composition according to the invention, silicone rubbers and elastomers can be caused to adhere to a very wide range of substrates.

The invention therefore relates to a method for improving the adhesion of silicone rubber to a substrate by applying the primer composition according to the invention to the substrate, air-drying or baking the primer composition in order to form a uniform primer film covering the substrate, applying a crosslinkable silicone rubber composition to the substrate covered with the primer in order to obtain a composite, curing the composite in order to obtain an adhesive bond of a silicone rubber with a substrate.

Examples of substrates are metals such as iron, nickel, aluminum, copper, zinc, stainless steel, brass, bronze and alloys thereof and surface-treated metals such as galvanized or phosphated steel or anodized aluminum, plastics, such as, for example, natural rubber, epoxy, polyester and polyamide resins, PVC and PBT, and inorganic materials, such as, for example, glass, glass fibers, mortar and asbestos.

All customary peroxide-crosslinking, addition-crosslinking and condensation-crosslinking silicone rubber compositions and fluorosilicone rubber compositions known to date can be used as the crosslinkable silicone rubber composition. These are peroxide-crosslinking and addition-crosslinking, such as platinum-crosslinking, HTV materials, LSR materials, and addition-crosslinking and condensation-crosslinking RTV-2 materials, the primer composition preferably being used in peroxide- and platinum-crosslinking HTV materials, LSR materials and platinum-crosslinking RTV-2 materials, and most preferably in addition-crosslinking HTV, LSR and RTV-2 materials. HTV, LSR and RTV materials are sufficiently well known to the person skilled in the art.

The production of the adhesive bond is effected by processes known in principle to the person skilled in the art. The adhesive bond is preferably produced by physically-mechanically or chemically cleaning or pretreating the substrate by known methods, such as, for example, by sand blasting, blasting, grinding, turning, etching, phosphating, chromatizing, corona treatment, flame treatment, UV irradiation and/or degreasing, such as, for example, with organic solvents or with acidic, neutral or alkaline aqueous cleaning agents, and then applying the primer composition by known methods, for example, spraying, rolling, brushing, application with a knife coater or by immersion, to the substrate.

The primer composition applied to the substrate is preferably dried at temperatures of from 0° C. to 150° C. for a period of preferably from 1 min to 100 hours. The optimum conditions for the drying are also dependent on the choice of the solvent. In a preferred embodiment, drying is effected at temperatures of from 20° C. to 50° C. for from 1 min to 2 hours. In another preferred embodiment, drying is effected at temperatures of from 90° C. to 150° C. for from 1 min to 30 min.

Moisture is required for the hydrolysis of the active constituents of the composition. The air-drying of the primer composition applied to the substrate is preferably effected at a relative humidity of 40-60%, which can optionally be established by air humidifiers. If the substrates are air-dried, for example in drying ovens or drying tunnels, the atmospheric humidity can also be established by blowing appropriately humidified air into the drying ovens. If the atmospheric humidity is too low, the hydrolysis does not take place or takes place too slowly. A well adhering film is not produced.

The unvulcanized silicone rubber is then applied to the primed substrate and preferably crosslinked at temperatures of from 80° C. to 250° C., more preferably from 130° C. to 200° C., for a period of preferably from 1 second to 10 hours to give a composite material. All methods known to date for applying silicone materials to substrates can be used here, for example, injection molding, extrusion, press molding, compression molding, transfer molding and pressing generally. The adhesive bond can, if required, then be heated at temperatures above room temperature for some time. The conditions are dependent on the substrate used and on the type of silicone rubber. In the case of RTV-2 rubbers, crosslinking can also be effected at atmospheric pressure at room temperature. For metals, the primed substrate is preferably vulcanized with the unvulcanized silicone rubber for, preferably, from 30 seconds to 20 min, preferably from 1 to 10 min, preferably at a temperature of from 160° C. to 200° C. under pressure, and optionally then preferably heated for from 2 to 6 hours, more preferably 4 hours, at 200° C. The pressure can be varied within wide limits, in particular from ambient pressure to very high pressures. The adhesion can frequently be improved by higher crosslinking temperatures and lower crosslinking times. The primed substrate can be stored for up to 2 months before it is adhesively bonded to the silicone rubber by the method described.

The primer composition according to the invention can advantageously be used in particular wherever good adhesive strength between a peroxide-crosslinking or addition-crosslinking silicone elastomer and a substrate, preferably consisting of organic plastics, metals or glasses, is desired. The substrate may be present as a shaped article, film or coating.

The primer composition is suitable for the production of composite materials by coating, adhesive bonding or casting and for the production of shaped articles. In particular, the primer compositions are suitable for the potting and for the adhesive bonding of electrical and electronic parts and for the production of composite shaped articles. Here, composite shaped articles is understood as meaning a uniform shaped article comprising a composite material, which is composed of a silicone elastomer part produced from the silicone compositions and at least one substrate, so that there is a strong, permanent bond between the two parts. Composite materials and in particular composite shaped articles can be used in a very wide range of applications, for example, in electronics, household appliances, commodity goods, construction and automotive industry, in medical technology and in the production of sports and leisure articles.

EXAMPLES

Rubber 1: Rubber 1 is a one-component, addition-crosslinking HTV silicone rubber, available from Wacker Chemie GmbH, Munich, Germany, under the name EL R 4001/60.

Rubber 2: Rubber 2 is an addition-crosslinking LSR silicone rubber, available from Wacker Chemie GmbH, Munich, Germany, under the name EL LR 3003/40.

Rubber 3: Rubber 3 is an addition-crosslinking RTV-2 silicone rubber, available from Wacker Chemie GmbH, Munich, Germany under the name EL RT 623.

Partial Hydrolysis Product 1:

Partial hydrolysis product 1 is a tetraethoxysilane partial hydrolysis product which, according to $^{29}$Si NMR analysis, has the following composition: 24 mol % of Q0 units, 52 mol % of Q1 units, 21 mol % of Q2 units and 3 mol % of Q3 units.

Partial Hydrolysis Product 2:

Partial hydrolysis product 2 is a tetraethoxysilane partial hydrolysis product which, according to $^{29}$Si NMR analysis, has the following composition: 8 mol % of Q0 units, 32 mol % of Q1 units, 45 mol % of Q2 units and 15 mol % of Q3 units.

Partial Hydrolysis Product 3:

Partial hydrolysis product 3 is a tetraethoxysilane partial hydrolysis product which, according to $^{29}$Si NMR analysis, has the following composition: 4 mol % of Q0 units, 14 mol % of Q1 units, 36 mol % of Q2 units, 42 mol % of Q3 units and 4 mol % of Q4 units.

Silicone Resin 1:

Silicone resin 1 is a toluene-soluble vinyl-containing MQ silicone resin having 55 mol % of Q units, 45 mol % of M units and a Q/Si—OEt ratio of 8.

Silicone Resin 2:

Silicone resin 2 is a toluene-soluble vinyl-free MQ silicone resin having 60 mol % of Q units, 40 mol % M units and a Q/Si—OEt ratio of 8.

Example 1

10.5 g of partial hydrolysis product 1, 9.8 g of tetrabutyl titanate and 9.0 g silicone resin 1 are dissolved in 120 g of a hydrocarbon fraction having a boiling range of 110-140° C. and stirred for one hour at room temperature.

Example C2 (Not According to the Invention)

10.5 g of partial hydrolysis product 1 and 9.8 g of tetrabutyl titanate are dissolved in 125 g of a hydrocarbon fraction having a boiling range of 110-140° C. and stirred for one hour at room temperature.

Example 3

10.5 g of partial hydrolysis product 1, 9.8 g of tetrabutyl titanate, 9.0 g of silicone resin 1 and 4.5 g of vinyltriethoxysilane are dissolved in 115 g of a hydrocarbon fraction having a boiling range of from 110-140° C. and stirred for one hour at room temperature.

Example C4 (Not According to the Invention)

10.5 g of partial hydrolysis product 1, 9.8 g of tetrabutyl titanate, 9.0 g of silicone resin 1 and 15.0 g of vinyltriethoxysilane are dissolved in 115 g of a hydrocarbon fraction having a boiling range of from 110-140° C. and stirred for one hour at room temperature.

Example 5

10.5 g of partial hydrolysis product 1, 9.8 g of tetrabutyl titanate, 9.0 g of silicone resin 1 and 4.5 g of methacryloyloxypropyltrimethoxysilane are dissolved in 115 g of a hydrocarbon fraction having a boiling range of from 110-140° C. and stirred for one hour at room temperature.

Example C6 (Not According to the Invention)

12.0 g of tetraethoxysilane, 9.8 g of tetrabutyl titanate, 9.0 g of silicone resin 1 and 4.5 g of methacryloyloxypropyltrimethoxysilane are dissolved in 115 g of a hydrocarbon fraction having a boiling range of 110-140° C. and stirred for one hour at room temperature.

Example C7 (Not According to the Invention)

9.0 g of partial hydrolysis product 2, 9.8 g of tetrabutyl titanate, 9.0 g of silicone resin 1 and 4.5 g of methacryloyloxypropyltrimethoxysilane are dissolved in 115 g of a hydrocarbon fraction having a boiling range of from 110-140° C. and stirred for one hour at room temperature.

Example C8 (Not According to the Invention)

7.5 g of partial hydrolysis product 3, 9.8 g of tetrabutyl titanate, 9.0 g of silicone resin 1 and 4.5 g of methacryloyloxypropyltrimethoxysilane are dissolved in 115 g of a hydrocarbon fraction having a boiling range of from 110-140° C. and stirred for one hour at room temperature.

Example C9 (Not According to the Invention)

10.5 g of partial hydrolysis product 1, 9.8 g of tetrabutyl titanate, 9.0 g of silicone resin 1 and 15.0 g of methacryloyloxypropyltrimethoxysilane are dissolved in 115 g of a hydrocarbon fraction having a boiling range of from 110-140° C. and stirred for one hour at room temperature.

Example C10 (Not According to the Invention)

5.0 g of tetraethoxysilane, 2.0 g of partial hydrolysis product 2, 3.0 g of tetrabutyl titanate, 3.5 g of silicone resin 1 and 5.0 g of vinyltriethoxysilane are dissolved in 80 g of a hydrocarbon fraction having a boiling range of 110-140° C. and stirred for one hour at room temperature.

Example 11

10.5 g of partial hydrolysis product 1, 9.8 g of tetrabutyl titanate, 9.0 g of silicone resin 1, 1.0 g of vinyltriethyoxysilane and 3.0 g of methacryloyloxypropyltrimethoxysilane are dissolved in 115 g of a hydrocarbon fraction having a boiling range of from 110-140° C. and stirred for one hour at room temperature.

Example 12

10.5 g of partial hydrolysis product 1, 9.8 g of tetrabutyl titanate, 9.0 g of silicone resin 1 and 4.0 g of 1,2-bistriethyoxysilylethane are dissolved in 115 g of a hydrocarbon fraction having a boiling range of from 110-140° C. and stirred for one hour at room temperature.

Example 13

10.5 g of partial hydrolysis product 1, 9.8 g of tetrabutyl titanate, 9.0 g of silicone resin 1 and 4.5 g of 1,2-bistriethoxysilyloctane are dissolved in 115 g of a hydrocarbon fraction having a boiling range of from 110-140° C. and stirred for one hour at room temperature.

Example 14

23.0 g of partial hydrolysis product 1, 19.5 g of tetrabutyl titanate, 17.0 g of silicone resin 1 and 8.5 g of 1,2-bistriethoxysilylethane are dissolved in 230 g of p-xylene and stirred for one hour at room temperature.

Example 15

18.5 g of partial hydrolysis product 1, 23.5 g of tetrabutyl titanate, 17.0 g of silicone resin 1 and 5.0 g of methacryloyloxypropyltrimethoxysilane are dissolved in 230 g of a hydrocarbon fraction having a boiling range of 150-180° C. and stirred for one hour at room temperature. The primer coat is air-dried for 20 min at 140° C. after application.

Example 16

25.5 g of partial hydrolysis product 1, 24.5 g of tetrabutyl titanate, 15.8 g of silicone resin 1 and 9.0 g of 1,2-bistriethoxysilyethane are dissolved in 305 g of sec-butanol and stirred for one hour at 70° C. The primer coat is air-dried for 20 min at 100° C. after application.

100 g of the primer from example 16 are diluted with 200 g of sec-butanol. The dilute primer is applied to an aluminum substrate. The wetting is not complete. 100 g of the primer from example 13 are diluted with 200 g of isopropanol. The dilute primer is applied to an aluminum substrate. No wetting problems are found.

Example 17

25.0 g of partial hydrolysis product 1, 38.9 g of tetrabutyl titanate, 20.0 g of silicone resin 1 and 7.0 g of methacryloyloxypropyltrimethoxysilane are dissolved in 390 g of sec-butanol and stirred for one hour at 70° C. The primer coat is air-dried for 20 min at 100° C. after application.

Example C18 (Not According to the Invention)

26.5 g of partial hydrolysis product 1, 27.5 g of tetrabutyl titanate, 7.0 g of silicone resin 1 and 10.0 g of 1,2-bistriethoxysilylethane are dissolved in 330 g of a hydrocarbon fraction having a boiling range of 110-140° C.

Example 19

26.5 g of partial hydrolysis product 1, 27.5 g of tetrabutyl titanate, 10.5 g of silicone resin 1 and 10.0 g of 1,2-bistriethoxysilylethane are dissolved in 330 g of a hydrocarbon fraction having a boiling range of 110-140° C.

Example 20

26.5 g of partial hydrolysis product 1, 27.5 g of tetrabutyl titanate, 18.5 g of silicone resin 1 and 10.0 g of 1,2-bistriethoxysilylethane are dissolved in 330 g of a hydrocarbon fraction having a boiling range of 110-140° C.

Example 21

26.5 g of partial hydrolysis product 1, 27.5 g of tetrabutyl titanate, 28.0 g of silicone resin 1 and 10.0 g of 1,2-bistriethoxysilylethane are dissolved in 330 g of a hydrocarbon fraction having a boiling range of 110-140° C.

Example C22 (Not According to the Invention)

26.5 g of partial hydrolysis product 1, 27.5 g of tetrabutyl titanate, 34.0 g of silicone resin 1 and 10.0 g of 1,2-bistriethoxysilylethane are dissolved in 330 g of a hydrocarbon fraction having a boiling range of 110-140° C.

Example 23

7.0 g of partial hydrolysis product 1, 9.5 g of tetrabutyl titanate, 6.5 g of silicone resin 1 and 1.5 g of glycidyloxypropyltrimethoxysilane are dissolved in 105 g of a hydrocarbon fraction having a boiling range of 110-140° C. and stirred for one hour at room temperature.

Example 24

23.0 g of partial hydrolysis product 1, 29.5 g of tetrabutyl titanate, 20.5 g of silicone resin 1 and 7.0 g of methacryloyloxypropyltrimethoxysilane are dissolved in 330 g of a hydrocarbon fraction having a boiling range of 110-140° C.

Example 25

16.3 g of partial hydrolysis product 1, 9.0 g of tetramethyl titanate, 12.0 g of silicone resin 1 and 7.0 g of 1,2-bistriethoxysilylethane are dissolved in 250 g of a hydrocarbon fraction having a boiling range of 110-140° C. and stirred for one hour at 70° C.

Example 26

14.0 g of partial hydrolysis product 1, 20.0 g of tetrabutyl titanate, 12.0 g of silicone resin 1 and 4.0 g of methacryloyloxymethyltrimethoxysilane are dissolved in 250 g of a hydrocarbon fraction having a boiling range of 110-140° C. and stirred for one hour at 70° C.

Example 27

16.0 g of partial hydrolysis product 1, 22.0 g of tetraethyl titanate, 12.0 g of silicone resin 1 and 4.0 g of methacryloyloxymethyltrimethoxysilane are dissolved in a mixture of 230 g of a hydrocarbon fraction having a boiling range of 110-140° C. and 20 g of methanol and stirred for one hour at 70° C.

Example 28

10.0 g of the primer from example 25 are diluted with 50.0 g of a hydrocarbon fraction having a boiling range of 110-140° C.

Example C29 (Not According to the Invention)

13.0 g of partial hydrolysis product 1, 22.0 g of tetrabutyl titanate and 11.0 g of methacryloyloxymethyltrimethoxysilane are dissolved in 250 g of a hydrocarbon fraction having a boiling range of 110-140° C. and stirred for one hour at 70° C.

Example 30

16.0 g of partial hydrolysis product 1, 29.0 g of tetrabutyl titanate, 10.0 g of silicone resin 1, 4.0 g of methacryloyloxymethyltrimethoxysilane and 30 mg of a solution of a 1,3-divinyl-1,1,3,3-tetramethyldisiloxane-platinum complex in toluene, which has a Pt content of 1% by weight, are dissolved in a mixture of 180 g of a hydrocarbon fraction having a boiling range of 110-140° C. and 20 g of methanol and stirred for one hour at 70° C.

Example 31

25.5 g of partial hydrolysis product 1, 24.5 g of tetrabutyl titanate, 15.8 g of silicone resin 2 and 9.0 g of 1,2-bistriethoxysilylethane are dissolved in 305 g of sec-butanol and stirred for one hour at 70° C. The primer coat is air-dried for 20 min at 100° C. after application.

Characterization of the Adhesion:

The substrates used had a size (W×L×D) of 25 mm×60 mm×3 mm or 25 mm×60 mm×2 mm. Steel substrates were sand blasted and then degreased with acetone, and the other substrates were only degreased with acetone, ethanol or toluene. Thereafter, the substrate was coated with the primer to be tested and brought to a comparable coat thickness using a doctor blade. Unless stated otherwise, the small plates thus primed were stored in air for one hour before they were placed in a stainless steel mold and the mold was filled with the stated silicone elastomer material. Similar values were obtained using other addition-crosslinking silicone materials (HTV and LSR materials). In examples 25 to 30, the primers were applied by immersion of the substrates, the primer coat was baked for 5 min at 160° C. and the further procedure was as stated above. In example 31, the primer was applied by means of a brush and the primed substrate was stored for one hour at room temperature. The rubber was then applied in a mold and cured for 24 hours at room temperature under atmospheric pressure.

The press vulcanization was effected for 15 min at a temperature of 165° C. and a pressure of 30 metric tons.

The composites with metal substrates were finally heated in a forced-circulation drying oven at 200° C. for 4 hours. After removal of the composites, the rigid substrate body was firmly clamped and the maximum separation force which is necessary to detach the adhering silicone elastomer strip was determined in a peeling experiment. The separation force was determined according to DIN 53531 (with the following special features: the thickness of the support plate was 3 or 2 mm and the thickness of the elastomer above the support plate was 5 mm) and is stated in N/mm. 5 adhesive bonds were measured per example, the separation force was determined as a mean value and the tearing pattern was assessed (cohesive or adhesive failure; in some experiments in which no separation forces were determined, the proportion of cohesive failure is stated in percent). Cohesive failure of 0% means that the silicone elastomer was detached completely and without residue from the substrate surface. Cohesive failure of 100% means that the delamination took place exclusively by tearing within the silicone elastomer.

The adhesion of the primer compositions according to the invention and not according to the invention were tested on the following substrates:
I. steel St 37
II. aluminum (industrial quality)
III. electrogalvanized steel sheet
IV. glass fiber-reinforced epoxy panels (glass fiber-reinforced plastic)
V. polybutylene terephthalate (PBT): Ultradur® B4300G6 (BASF AG; 30% of glass fibers)
VI. polyamide 6: Durethan® BKV30 (Bayer AG; 30% of glass fibers)
VII. polyamide 6.6: Ultramid® A3WG6 (BASF AG; 30% of glass fibers)

The results are summarized in Tables 1 and 2. After the value for the separation force, whether the bond fails predominantly through cohesive (LC) or adhesive failure (LA) is stated in brackets. In the case of entries "n.a." (no adhesion), the bond failed without measurable separation force; "n.d." stands for not determined. In experiments in which no separation force was determined, the approximate proportion of loss of cohesion is stated in percent.

TABLE 1

Adhesion with rubber 1 (HTV) to metal substrates.

| Primer from example | Film after air-drying | Separation force [N/mm] | | |
|---|---|---|---|---|
| | | Steel St 37 | Aluminum | Phosphated steel |
| 1 | uniform | 4.0 (LC) | 8.2 (LC) | |
| C2* | uniform | n.a. | 1.5 (LA) | |
| 3 | uniform | 7.3 (LC) | 8.5 (LC) | |
| C4 | irregular | 3.5 (LA) | 4.2 (LA) | |
| 5 | substantially uniform | 9.2 (LC) | 7.2 (LC) | |
| C6 | irregular, turbid | n.d | 2.9 (LA) | |
| C7 | nonuniform | n.d | 3.4 (LA) | |
| C8 | nonuniform | n.d | 1.8 (LA) | |
| C9 | turbid | 4.5 (partial LA) | 3.3 (LA) | |
| C10 | brittle | n.a. | 1.1 (LA) | |
| 11 | uniform | 7.5 (LC) | 9.9 (LC) | |
| 12 | uniform | 10.2 (LC) | 10.3 (LC) | |
| 13 | uniform | 7.9 (LC) | 10.6 (LC) | |
| 14 | incomplete wetting | 3.0 (LA) | 2.9 (LA) | 7.8 (LC) |
| 15 | slightly turbid | 7.2 (LC) | 7.9 (LC) | |
| 16 | uniform | 10.7 (LC) | 8.3 (LC) | |
| 17 | uniform, slightly turbid | 6.5 (LC) | 11.3 (LC) | |
| C18 | uniform | 2.4 (LA) | 2.3 (LA) | |
| 19 | uniform | 6.8 (LC) | 7.3 (LC) | |
| 20 | uniform | 10.7 (LC) | 9.9 (LC) | |
| 21 | uniform | 5.1 (LC) | 8.4 (LC) | |
| C22 | uniform | 1.4 (LA) | 2.9 (LA) | |
| 23 | uniform, slightly turbid | 8.2 (LC) | 10.6 (LC) | |
| 24 | uniform | 9.4 (LC) | 10.4 (LC) | |

*C reflects a comparative example, i.e. not according to the invention

TABLE 2

Adhesion of rubbers 2 and 3 to substrates.

| Primer from example | Film after air-drying | Separation force [N/mm] | | | | | | |
|---|---|---|---|---|---|---|---|---|
| | | St 37 | Al | Galvanized steel sheet | epoxy glass fiber reinforced plastic | PBT | PA 6 | PA 6.6 |
| 20 | uniform | 6.0 (LC) | 11.4 (LC) | | 12.0 | 9.2 | 11.7 | 11.9 |
| 24 | uniform | 2.4 (LA) | 8.7 (LC) | | 11.7 | 9.0 | 7.1 | 11.1 |

TABLE 2-continued

Adhesion of rubbers 2 and 3 to substrates.

Separation force [N/mm]

| Primer from example | Film after air-drying | St 37 | Al | Galvanized steel sheet | epoxy glass fiber reinforced plastic | PBT | PA 6 | PA 6.6 |
|---|---|---|---|---|---|---|---|---|
| 25 | uniform, slightly turbid | | | 100% LC | | | | |
| 26 | uniform | | | 100% LC | | | | |
| 27 | uniform | | | 100% LC | | | | |
| 28 | uniform | | | 95% LC | | | | |
| C29* | uniform | | | 0% LC | | | | |
| 30 | uniform | | | 100% LC | | | | |
| 31 | uniform | | 100% LC | | | | | |

*not according to the invention

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A primer composition comprising:
(A) 100 parts by weight of a partial hydrolysis product of at least one tetraalkoxysilane, or a mixture of said partial hydrolysis product and at least one tetraalkoxysilane;
(B) 25-400 parts by weight, based on 100 parts by weight of component (A), of a component selected from the group consisting of metal salts, metal alkoxides, metal chelates, partial hydrolysis products thereof, and mixtures thereof;
(C) 25-125 parts by weight, based on 100 parts by weight of component (A), of at least one silicone resin; and
(D) at least one solvent selected from the group consisting of organic solvents, low molecular weight cyclic and linear polyorganosilicone compounds and mixtures thereof, with the proviso that the proportion of the solvent, based on the total composition, is 50-95% by weight, wherein the partial hydrolysis product of at least one tetraalkoxysilane of constituent (A) comprises:
0-45 mol % of Q0 units,
30-80 mol % of Q1 units,
5-50 mol % of Q2 units, and
0-15 mol % of Q3 units.

2. The primer composition of claim 1, wherein constituent (A) comprises a partial hydrolysis product comprising:
5-35 mol % of Q0 units,
30-80 mol % of Q1 units,
5-50 mol % of Q2 units, and
15 mol % of Q3 units,
wherein Q4 radicals comprise any remaining mol % of constituent A, and Q0 units are $Si(OR^1)_4$, Q1 units are $(R^1O)_3SiO_{1/2}$, Q2 units are $(R^1O)_2SiO_{2/2}$, Q3 units are $(R^1O)_1SiO_{3/2}$ and Q4 units are $SiO_{4/2}$ and $R^1$ independently of one another, are monovalent, substituted or unsubstituted hydrocarbon radicals.

3. The primer composition of claim 2, wherein the primer composition additionally comprises:
(E) one or more organosilicon compounds having at least one hydrolyzable group, the partial hydrolysis product thereof, or a mixture thereof, the organosilicon compound comprising one or more compounds having the average formula (V)

$$R^5_b R^6_c R^7_d SiX_{4-b-c-d} \qquad (V)$$

in which
$R^5$ is a monovalent, aliphatically unsaturated, substituted or unsubstituted hydrocarbon radical having 2 to 18 carbon atoms,
$R^6$ is an optionally halogen-substituted, monovalent hydrocarbon radical having 1 to 18 carbon atoms,
$R^7$ are $R^5_b R^6_c SiX_{3-b-c}$—$R^8$— or $YR^8$-radicals,
X is a hydrolyzable group —$O_2CR^6$, —$OR^6$, —$NR^6_2$, $R^6$—$C(=O)$—$N(R^6)$—, or —$O$—$N=CR^6_2$,
Y is a monovalent radical selected from the group consisting of anhydride, aminoalkoxy, aminoalkyl, N-aminoalkylamino, acryloylxy, methacryloyloxy, sulfone, sulfonate, phosphate, phosphonate, amino, N-alkylamino, epoxy and mercapto radicals,
$R^8$ is a divalent, optionally substituted hydrocarbon radical having 1 to 22 carbon atoms, which may contain one or more heteroatoms selected from the group consisting of N, O, and S, and
b,c,d independently, are 0, 1, 2 or 3.

4. The primer composition of claim 3, wherein at least one constituent (E) is selected from the group consisting of 3-(methacryloyloxy)propyltrimethoxysilane, 3-(methacryloyloxy)methyltrimethoxysilane, 3-(glycidyloxy)propyltrimethoxysilane and 1,2-bis(triethoxysilyl)ethane.

5. The primer composition of claim 4, wherein the solvent is sec-butanol or a mixture containing sec-butanol.

6. The primer composition of claim 4, wherein the primer composition contains, as solvent (D), from 70 to 90% by weight of a hydrocarbon fraction comprising C7 to C10 alkanes and having a boiling range of 110-140° C., or a hydrocarbon fraction comprising C9 to C12 alkanes and having a boiling range of 150-180° C.

7. The primer composition of claim 4, wherein the primer composition contains, as solvent (D), from 70 to 95 percent by weight of an aliphatic alcohol selected from the group consisting of ethanol, isopropanol, n-butanol, isobutanol, sec-butanol, and mixtures thereof.

8. A process for the preparation of a primer composition of claim 3, comprising uniformly dissolving or mixing components (A), (B), and (C) in the solvent (D) in a mixing unit.

9. The primer composition of claim 1, wherein the primer composition contains, as solvent (D), from 70 to 90% by weight of a hydrocarbon fraction comprising C7 to C10 alkanes and having a boiling range of 110-140° C., or a hydrocarbon fraction comprising C9 to C12 alkanes and having a boiling range of 150-180° C.

10. A process for the preparation of a primer composition of claim 1, comprising uniformly dissolving or mixing components (A), (B), and (C) in the solvent (D) in a mixing unit.

11. The process of claim 9, wherein the composition is heated to 50 to 100° C. for half an hour to 4 hours after the uniform mixing or dissolution.

12. The process of claim 9, wherein the primer composition is diluted with further solvent.

13. A method for improving the adhesion of silicone rubber to a substrate, comprising applying a primer composition of claim 1, to the substrate, air-drying or baking the primer composition in order to form a uniform primer film covering the substrate, applying of a crosslinkable silicone rubber composition to the substrate covered with the primer to obtain a composite, and curing the composite in order to obtain a silicone rubber adhesively bonded to a substrate.

14. The method of claim 13, wherein the substrate is a metal selected from the group consisting of iron, nickel, aluminum, copper, zinc, stainless steel, brass, bronze and alloys thereof, and surface-treated metal selected from the group consisting of galvanized steel, phosphated steel, anodized aluminum, a plastic selected from the group consisting of natural rubber, epoxy, polyester and polyamide resins, PVC and PBT, and an inorganic material selected from the group consisting of glass, glass fibers, mortar and asbestos.

15. The method of claim 13, wherein the primer composition applied to the substrate is dried at a temperature of from 0° C. to 150° C. for from 1 min to 100 hours.

16. A primer composition comprising:
(A) 100 parts by weight of a partial hydrolysis product of at least one tetraalkoxysilane, or a mixture of said partial hydrolysis product and at least one tetraalkoxysilane;
(B) 25-400 parts by weight, based on 100 parts by weight of component (A), of a component selected from the group consisting of metal salts, metal alkoxides, metal chelates, partial hydrolysis products thereof, and mixtures thereof;
(C) 25-125 parts by weight, based on 100 parts by weight of component (A), of a silicone resin component containing at least one MQ resin, and
(D) at least one solvent selected from the group consisting of organic solvents, low molecular weight cyclic and linear polyorganosilic one compounds and mixtures thereof, with the proviso that the proportion of the solvent, based on the total composition, is 50-95% by weight, wherein the partial hydrolysis product of at least one tetraalkoxysilane of constituent (A) comprises:
0-45 mol % of Q0 units,
30-80 mol % of Q1 units,
5-50 mol % of Q2 units, and
0-20 mol % of Q3 units.

17. A primer composition comprising:
(A) 100 parts by weight of a partial hydrolysis product of at least one tetraalkoxysilane, or a mixture of said partial hydrolysis product and at least one tetraalkoxysilane;
(B) 25-400 parts by weight, based on 100 parts by weight of component (A), of a component selected from the group consisting of metal salts, metal alkoxides, metal chelates, partial hydrolysis products thereof, and mixtures thereof;
(C) 25-125 parts by weight, based on 100 parts by weight of component (A), of at least one silicone resin; and
(D) at least one solvent selected from the group consisting of organic solvents, low molecular weight cyclic and linear polyorganosilicone compounds and mixtures thereof, with the proviso that the proportion of the solvent, based on the total composition, is 50-95% by weight, wherein the partial hydrolysis product of at least one tetraalkoxysilane of constituent (A) comprises:
0-45 mol % of Q0 units,
30-80 mol % of Q1 units,
5-50 mol % of Q2 units,
0-15 mol % of Q3 units, and
(E) at least one H-siloxane.

* * * * *

UNITED STATES PATENT AND TRADEMARK OFFICE
CERTIFICATE OF CORRECTION

PATENT NO. : 7,575,655 B2  
APPLICATION NO. : 11/377169  
DATED : August 18, 2009  
INVENTOR(S) : Arvid Kuhn et al.

Page 1 of 1

It is certified that error appears in the above-identified patent and that said Letters Patent is hereby corrected as shown below:

Column 21, Line 60, Claim 2:

Delete "15 mol %" and insert -- 0 - 15 mol % --.

Column 24, Line 9, Claim 16:

Delete "polyorganosilic one" and insert -- polyorganosilicone --.

Signed and Sealed this

Tenth Day of November, 2009

David J. Kappos  
*Director of the United States Patent and Trademark Office*

UNITED STATES PATENT AND TRADEMARK OFFICE
CERTIFICATE OF CORRECTION

PATENT NO. : 7,575,655 B2　　　　　　　　　　　　　　　　　　　　Page 1 of 1
APPLICATION NO. : 11/377169
DATED : August 18, 2009
INVENTOR(S) : Kuhn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Seventh Day of September, 2010

David J. Kappos
*Director of the United States Patent and Trademark Office*